(12) United States Patent
Liu et al.

(10) Patent No.: US 7,319,288 B2
(45) Date of Patent: Jan. 15, 2008

(54) CARBON NANOTUBE-BASED FIELD EMISSION DEVICE

(75) Inventors: Liang Liu, Beijing (CN); Shoushan Fan, Beijing (CN)

(73) Assignees: Tsing Hua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 186 days.

(21) Appl. No.: 10/811,442

(22) Filed: Mar. 26, 2004

(65) Prior Publication Data

US 2004/0189177 A1    Sep. 30, 2004

(30) Foreign Application Priority Data

Mar. 27, 2003    (CN) .............................. 03 1 14067

(51) Int. Cl.
*H01J 1/02* (2006.01)

(52) U.S. Cl. .................. 313/309; 313/495; 313/336; 313/351

(58) Field of Classification Search ........ 313/402–407, 313/309–311, 293–304, 495–497, 336, 351; 445/50, 51, 24, 25
See application file for complete search history.

(56) References Cited

U.S. PATENT DOCUMENTS

| 6,097,138 A * | 8/2000 | Nakamoto .................. 313/309 |
| 6,232,706 B1 | 5/2001 | Dai et al. |
| 6,515,415 B1 | 2/2003 | Han et al. |
| 7,115,013 B2 * | 10/2006 | Liu et al. ..................... 445/50 |
| 2003/0044537 A1 | 3/2003 | Chang et al. |

FOREIGN PATENT DOCUMENTS

CN        00121140        3/2001

* cited by examiner

*Primary Examiner*—Vip Patel
(74) *Attorney, Agent, or Firm*—Wei Te Chung

(57) ABSTRACT

A carbon nanotube-based field emission device in accordance with the invention includes: a cathode electrode (50), a carbon nanotube array (40) formed perpendicularly on the cathode electrode, a barrier (20) and a gate electrode (60). The carbon nanotube array has a growth end (42) electrically contacting with the cathode electrode, and an opposite root end (44) for emitting electrons therefrom. The root end of the carbon nanotube array defines a substantially planar surface having a flatness of less than 1 micron.

18 Claims, 3 Drawing Sheets

CARBON NANOTUBE-BASED FIELD EMISSION DEVICE

BACKGROUND OF THE INVENTION

1. Field of the Invention

The present invention relates to a field emission device, and more particularly to a field emission device utilizing carbon nanotubes as emitters.

2. Description of Prior Art

Carbon nanotubes are a novel carbonaceous material discovered by Iijima, a researcher of NEC corporation, in 1991. Relevant information was reported in an article by Iijima, entitled "Helical Microtubules of Graphitic Carbon" (Nature, Vol.354, P56, 1991). Carbon nanotubes can transmit an extremely high electrical current and can emit electrons at a very low voltage of less than 100 volts, which makes it a very promising material for field emission applications. Walt A. de Heer et al. reported a field emission device employing carbon nanotubes as an electron emission source in an article entitled "A Carbon Nanotube Field-Emission Electron Source" (Science, Vol. 270, P1179-1180, 1995). Shoushan Fan et al. reported a method using a CVD (chemical vapor deposition) process for producing aligned parallel bundles of carbon nanotubes on a silicon or glass substrate in an article entitled "Self-oriented regular arrays of carbon nanotubes and their field emission properties" (Science, Vol. 283, P512-514, 1999).

Referring to FIG. 8, P. R. China patent application No. 00121140 discloses a field emission device using carbon nanotubes 90 as emitters. The carbon nanotubes 90 are mounted vertically on conductive polymer film (not labeled), fixed within corresponding fine holes 80 by simply putting the carbon nanotubes 90 into the fine holes 80. However, the carbon nanotubes 90 differ in height so that a top surface of the carbon nanotubes 90 is not flat. Therefore, the electron emissions from the emitters may be not uniform.

Referring to FIG. 9, U.S. Pat. No. 6,232,706, invented by Hongjie Dai et al., discloses a field emission device using aligned parallel bundles of carbon nanotubes 100 extending from patterned catalyst layers 130 deposited on a layer of porous silicon 120, which formed on a substrate 110. The bundles of carbon nanotubes 100 are formed using a chemical vapor deposition (CVD) process. However, the carbon nanotubes formed have a variety of heights, within a certain range, so that the bundles of carbon nanotubes can form a flat top, a bow-shaped top, or other shapes, which are neither predictable nor controllable. Furthermore, a thin layer, including disorderly nanotubes, a certain amount of remaining catalyst particles, and amorphous carbon material, may be produced on the tops of the bundles. All of the above defects may reduce the uniformity and stability of electron emissions from the bundles of carbon nanotubes.

SUMMARY OF THE INVENTION

Accordingly, an object of the present invention is to provide a carbon nanotubes-based field emission device having an improved uniformity and stability of electron emissions.

In order to achieve the objects set above, a preferred carbon nanotube-based field emission device in accordance with the present invention comprises: a cathode electrode made of a conductive material and a carbon nanotube array formed substantially perpendicularly to the cathode electrode, a barrier, and gate electrodes. A growth end of the carbon nanotube array is in electrical contact with the cathode electrode, and an opposite root end of the carbon nanotube array has a substantially flat surface, a flatness of the surface being less than 1 micron. The flat surface of the carbon nanotube array results in more uniform and stabile electron emissions from the nanotube array.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Reference will now be made to the drawings to describe a preferred embodiment of the present invention in detail.

Figure 6:
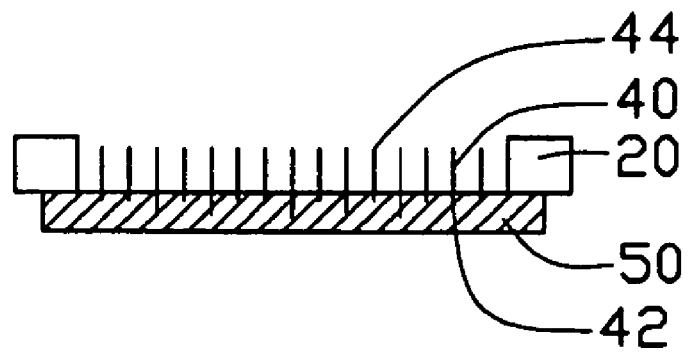
FIG. 6 is a schematic, side elevation view of a carbon nanotubes-based field emission device after removal of the working plate of FIG. 5.
Figure 7:
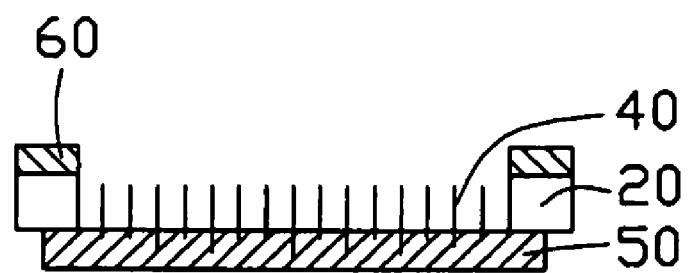
FIG. 7 is a schematic, side elevation view of the field emission device showing gate electrodes formed on top of the barrier.
Figure 8:
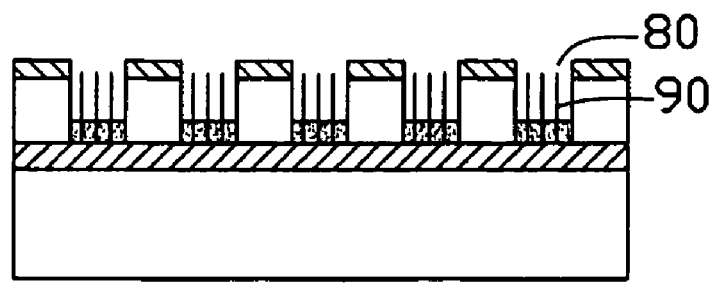
FIG. 8 is a schematic view of a first conventional carbon nanotube field emission device.
Figure 9:
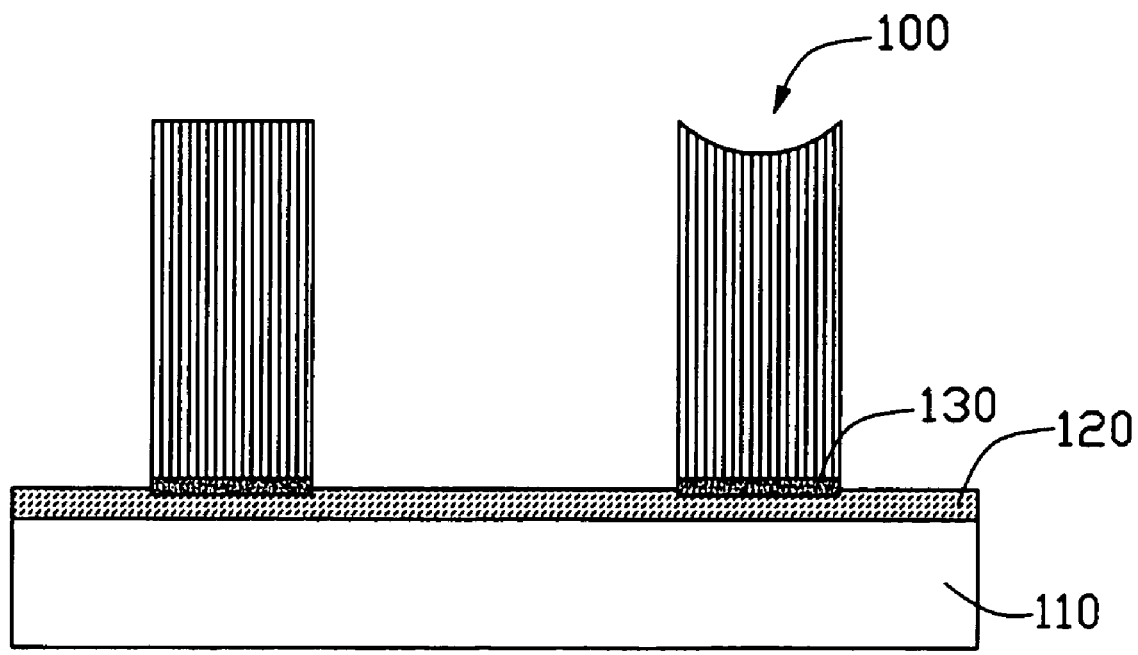
FIG. 9 is a schematic view of a second conventional carbon nanotube field emission device.

Referring initially to FIG. 7, a carbon nanotube-based field emission device in accordance with a preferred embodiment of the present invention comprises: a cathode electrode 50, a carbon nanotube array 40 formed substantially perpendicularly to the cathode electrode 50, and gate electrodes 60 formed on an insulative barrier 20 adjacent the carbon nanotube array 40. The barrier 20 is positioned on the cathode electrode 50, and insulates the gate electrodes 60 from the cathode electrode 50. The carbon nanotube array 40 comprises a plurality of carbon nanotubes (not labeled). Preferably, each carbon nanotube has an open tip to facilitate electron emission therefrom. Referring also to FIG. 6, the carbon nanotube array 40 defines a growth end 42, and a root end 44 opposite to the growth end 42. The growth end 42 is embedded in and thus is in electrical contact with the cathode electrode 50. The root end 44 is substantially planar, preferably with a flatness of less than 1 micron. The root end 44 almost reaches but does not quite reach a height of the barrier 20.

A preferred method for making such a carbon nanotube-based field emission device will be described in detail with reference to FIGS. 1 to 7 below.

Figure 1:
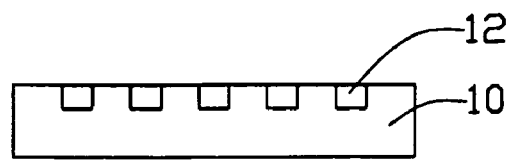
FIG. 1 is a schematic, side elevation view of a working plate having a number of grooves therein according to a preferred embodiment of the present invention.

Referring to FIG. 1, a working plate 10 with a substantially planar surface (not labeled) is provided. A plurality of small-sized grooves 12 is defined in the planar surface. Preferably, a flatness of the planar surface is less than 1 micron. The grooves 12 are for facilitating subsequent removal of the working plate 10. The working plate 10 should be sufficiently heat stable to endure the high temperatures of about 700 degrees Centigrade at which carbon nanotubes are produced. In the preferred embodiment, the working plate 10 is made of porous silicon.

Figure 2:
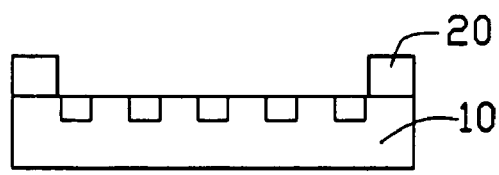
FIG. 2 is a schematic, side elevation view of a barrier formed on opposite sides of the working plate of FIG. 1.

Referring to FIG. 2, an insulative barrier 20 is formed on the planar surface of the working plate 10 by a plating or printing process. A height of the barrier 20 is determined according to a desired height of the carbon nanotube array 40 that is produced in a later step. The height of the barrier 20 may be in the range from 5 microns to 10 mm, and is preferably in the range from 10 to 500 microns. The barrier 20 is made of a heat stable material, such as heatproof glass, silicon, silicon oxide, ceramic or mica, which can endure the high temperatures of about 700 degrees Centigrade at which carbon nanotubes are produced.

Figure 3:
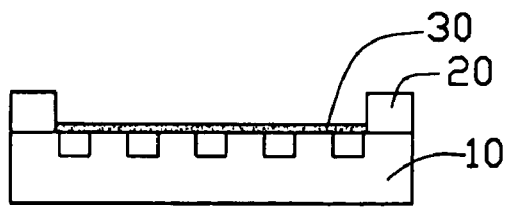
FIG. 3 is a schematic, side elevation view of a catalyst layer deposited on the working plate of FIG. 2.

Referring to FIG. 3, a catalyst layer 30 is deposited on the working plate 10 to a thickness of about 5 nm by an electron beam evaporation, heat evaporation or sputtering process. Generally, the thickness of the catalyst layer 30 may be in the range from 1 nm to 10 nm, and is preferably in the range of 4 nm to 6 nm. A material of the catalyst layer 30 is selected from Fe (Iron), Co (Cobalt), Ni (Nickel) or an alloy thereof.

Figure 4:
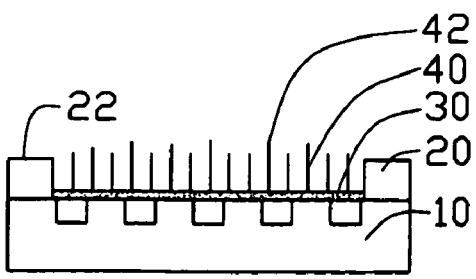
FIG. 4 is a schematic, side elevation view of a carbon nanotube array grown from the catalyst layer of FIG. 3.

Referring to FIG. 4, the catalyst layer 30 is annealed at a temperature of 200~400 degrees Centigrade. The catalyst layer 30 is thereby oxidized and shrunk into nanoparticles. The working plate 10 with the annealed catalyst layer 30 is then put into a reaction chamber (not shown). The carbon nanotube array 40 is grown from the catalyst layer 30 by a CVD (chemical vapor deposition) method, until the growth end 42 of the carbon nanotube array 40 reaches or just exceeds a first surface 22 of the barrier 20.

Figure 5:
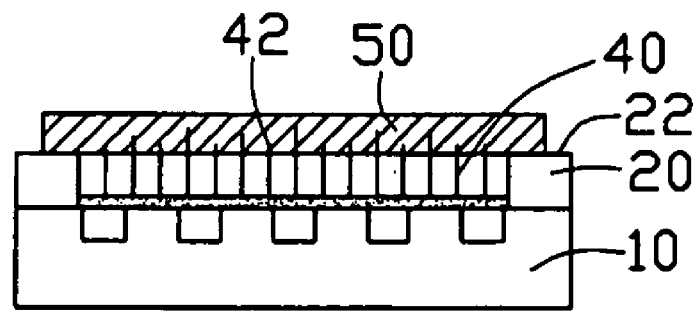
FIG. 5 is a schematic, side elevation view of a cathode electrode formed on top of the carbon nanotube array of FIG. 4.

Referring to FIG. 5, a cathode electrode 50 is deposited on the growth end 42 of the carbon nanotube array 40 by an electron beam evaporation, heat evaporation or sputtering process. By this process, the cathode electrode 50 covers the entire area of the growth end 42, and either portions of or the entirety of the first surface 22 of the barrier 20. The carbon nanotube array 40 is thus in electrical contact with the cathode electrode 50. The cathode electrode 50 is made of a conductive metallic material, such as Cu (copper).

Referring to FIG. 6, the working plate 10 is removed, so that the root end 44 of the carbon nanotube array 40 is exposed. Furthermore, if necessary, the root end 44 of the carbon nanotube array 40 may be treated with laser irradiation in order to clean the remaining catalyst particles.

Referring to FIG. 7, one or more gate electrodes 60 is desposited on a second surface (not labeled) of the barrier 20 that is opposite to the first surface 22, by an electron beam evaporation, heat evaporation or sputtering process. The gate electrodes 60 can be made of a same material as the cathode electrode 50. Accordingly, electron emission from the carbon nanotube array 40 can be controlled by the gate electrodes 60.

Using the above preferred method, the carbon nanotube-based field emission device is obtained. The root end 44 of the carbon nanotube array 40 almost reaches but does not quite reach the height of the barrier 20. A flatness of the exposed root end 44 of the carbon nanotube array 40 is mainly dependent upon the flatness of the planar surface of the working plate 10, which is less than 1 micron. The root end 44 is flatter than the growth end 42, which is the end used for electron emission in a conventional field emission device. Therefore, electron emission of the carbon nanotube-based field emission device of the present invention using the root end 44 is more uniform and stable than that of the conventional field emission device.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A carbon nanotube-based field emission device comprising:
   a cathode electrode; and
   a carbon nanotube array of nanotube members, the carbon nanotube array of the nanotube members extending from a root end to a growth end, the carbon nanotube array being aligned perpendicular to the cathode electrode with each given growth, end embedded in the cathode electrode and the corresponding root end being outwardly directed and exposed;
   wherein the growth end of die carbon nanotube array is in electrical contact with the cathode electrode, and the root end thereof defines a planar surface with a flatness of less than one micron across the carbon nanotube array.

2. The field emission device as described in claim 1, wherein the cathode electrode is made of copper.

3. The field emission device as described in claim 1, wherein the carbon nanotube array comprises a plurality of carbon nanotubes, each of which has an open tip.

4. The field emission device as described in claim 1, wherein a height of the carbon nanotube array is in the range from 5 microns to 10 mm.

5. The field emission device as described in claim 1, wherein the height of carbon nanotube array is in the range from 10 to 500 microns.

6. The field emission device as described in claim 1, wherein an insulative barrier having a height exceeding the planar surface of the root end is formed adjacent the carbon nanotube array and at least a gate electrode is formed on the barrier such that the gate electrode is separated from the cathode electrode.

7. The field emission device as described in claim 6, wherein the root end of the carbon nanotube array reaches the interface between the barrier and the gate electrode.

8. A carbon nanotube-based field emission device comprising:
   a carbon nanotube array which grows from a root end and extends to a growth end; and
   a cathode electrode formed on and covering the growth end of the carbon nanotube array;
   wherein the root end defines a planar surface which is exposed outwardly and acts as an emitter, a flatness of the planar surface of the root end of the carbon nanotube array is less than 1 micron, and the growth end is embedded into the cathode electrode.

9. The field emission device as described in claim 8, wherein the carbon nanotube array comprises a plurality of carbon nanotubes, each of which has an open tip.

10. The field emission device as described in claim 8, wherein a height of the carbon nanotube array is in the range from 5 microns to 10 mm.

11. The field emission device as described in claim 8, wherein the height of carbon nanotube array is in the range from 10 to 500 microns.

12. The field emission device as described in claim 8, wherein at least a gate electrode is formed adjacent the carbon nanotube array at a height above the planar surface of the root end.

13. The field emission device as described in claim 12, wherein the gate electrode is supported by an insulative barrier formed adjacent the carbon nanotube array, such that the gate electrode is separated from the cathode electrode.

14. A method of making a carbon nanotube-based field emission device, comprising steps of:
providing a working plate having a planar surface;
depositing a catalyst layer on the planar surface of the working plate;
growing a carbon nanotube array on said catalyst layer wherein carbon nanotubes in said array extend from said catalyst layer with flat roots and define different heights with tips;
applying a cathode electrode to said tips of said carbon nanotubes;
separating said carbon nanotubes from said catalyst layer and exposing said flat roots so that the flat roots of the carbon nanotube array are thereby configured for acting as electron emission ends of the carbon nanotube-based field emission device; and
providing a gate electrode beside said flat roots.

15. The method as described in claim 14, wherein said gate electrode is supported by a barrier which is seated upon the cathode electrode.

16. The method as described in claim 15, wherein said cathode electrode is originally supportably seated upon said barrier for applying said cathode electrode to the tips after growth of said carbon nanotubes.

17. The method as described in claim 15, wherein a height of said barrier is equal to a common height of said carbon nanotubes measured from the cathode electrode.

18. The method as described in claim 14, wherein said planar surface of the working plate having a flatness of less than one micron.

* * * * *